United States Patent
Kesarwani et al.

(10) Patent No.: US 11,630,833 B2
(45) Date of Patent: Apr. 18, 2023

(54) EXTRACT-TRANSFORM-LOAD SCRIPT GENERATION

(71) Applicant: International Business Machines Corporation, Armonk, NY (US)

(72) Inventors: Manish Kesarwani, Bangalore (IN); Sumit Bhatia, New Delhi (IN); Sameep Mehta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/084,161

(22) Filed: Oct. 29, 2020

(65) Prior Publication Data
US 2022/0138216 A1 May 5, 2022

(51) Int. Cl.
*G06F 16/25* (2019.01)
*G06F 16/242* (2019.01)
*G06F 16/2455* (2019.01)
*G06F 16/2457* (2019.01)

(52) U.S. Cl.
CPC .......... *G06F 16/254* (2019.01); *G06F 16/243* (2019.01); *G06F 16/24565* (2019.01); *G06F 16/24573* (2019.01); *G06F 16/24578* (2019.01)

(58) Field of Classification Search
CPC ................. G06F 16/254; G06F 16/243; G06F 16/24573; G06F 16/24565; G06F 16/24578
See application file for complete search history.

(56) References Cited

U.S. PATENT DOCUMENTS

| | | | |
|---|---|---|---|
| 9,235,630 B1 | 1/2016 | Dietrich et al. | |
| 9,323,948 B2 | 4/2016 | Gupta et al. | |
| 9,430,505 B2 | 8/2016 | Padmanabhan et al. | |
| 9,665,662 B1* | 5/2017 | Gautam | G06F 16/24522 |
| 11,238,469 B1* | 2/2022 | Talvola | G06N 20/00 |
| 2005/0050037 A1* | 3/2005 | Frieder | G06F 16/90332 |
| 2016/0117293 A1 | 4/2016 | Dettman et al. | |
| 2017/0046409 A1* | 2/2017 | Bender | G06F 16/254 |
| 2017/0083569 A1 | 3/2017 | Boguraev et al. | |
| 2018/0150528 A1 | 5/2018 | Shah et al. | |
| 2019/0130008 A1 | 5/2019 | Nakagoe | |
| 2020/0167323 A1 | 5/2020 | Swamy et al. | |
| 2020/0302122 A1* | 9/2020 | Lai | G06F 16/24558 |
| 2021/0365306 A1* | 11/2021 | Haidar | G06F 40/205 |

\* cited by examiner

*Primary Examiner* — Jensen Hu
(74) *Attorney, Agent, or Firm* — Ference & Associates LLC

(57) ABSTRACT

One embodiment provides a computer implemented method, including: receiving, from a user, a natural language query for data contained within at least one data repository; identifying at least one concept from the natural language query, wherein the at least one concept includes an entity and an intent; identifying a plurality of datasets satisfying the natural language query by querying the at least one data repository utilizing the at least one concept; ranking the dataset based on relevance to the query; generating an extract-transform-load script that extracts, transforms, and loads a dataset selected by the user from the plurality of datasets; and retrieving data included in the dataset utilizing the extract-transform-load script, wherein the retrieving includes returning the data to the user.

18 Claims, 5 Drawing Sheets

EXTRACT-TRANSFORM-LOAD SCRIPT GENERATION

BACKGROUND

Digital data is stored in many different data repositories, for example, local data repositories, remote data repositories, cloud data repositories, and the like. The use of different data repositories provides different advantages. For example, a local data repository may provide the ability to more easily secure the data. However, a remote or cloud data repository allows for the data to be accessed from any location. Thus, users and entities employ a variety of different data repositories for storing and managing data. Additionally, within a single data repository different portions of a dataset may be stored in different sub-repository locations. For example, a cloud data repository may have tens, hundreds, or even thousands of different sub-repository locations. How the data is stored within each of these sub-repository locations is generally determined by policies or rules of the data repository administrator.

BRIEF SUMMARY

In summary, one aspect of the invention provides a computer implemented method, including: receiving, from a user, a natural language query for data contained within at least one data repository; identifying at least one concept from the natural language query, wherein the at least one concept includes an entity and an intent; identifying a plurality of datasets satisfying the natural language query by querying the at least one data repository utilizing the at least one concept; generating an extract-transform-load script that extracts, transforms, and loads a dataset selected by the user from the plurality of datasets; and retrieving data included in the dataset utilizing the extract-transform-load script, wherein the retrieving includes returning the data to the user.

Another aspect of the invention provides an apparatus, including: at least one processor; and a computer readable storage medium having computer readable program code embodied therewith and executable by the at least one processor; wherein the computer readable program code is configured to receive, from a user, a natural language query for data contained within at least one data repository; wherein the computer readable program code is configured to identify at least one concept from the natural language query, wherein the at least one concept includes an entity and an intent; wherein the computer readable program code is configured to identify a plurality of datasets satisfying the natural language query by querying the at least one data repository utilizing the at least one concept; wherein the computer readable program code is configured to generate an extract-transform-load script that extracts, transforms, and loads a dataset selected by the user from the plurality of datasets; and wherein the computer readable program code is configured to retrieve data included in the dataset utilizing the extract-transform-load script, wherein the retrieving includes returning the data to the user.

An additional aspect of the invention provides a computer program product, including: a computer readable storage medium having computer readable program code embodied therewith, the computer readable program code executable by a processor; wherein the computer readable program code is configured to receive, from a user, a natural language query for data contained within at least one data repository; wherein the computer readable program code is configured to identify at least one concept from the natural language query, wherein the at least one concept includes an entity and an intent; wherein the computer readable program code is configured to identify a plurality of datasets satisfying the natural language query by querying the at least one data repository utilizing the at least one concept; wherein the computer readable program code is configured to generate an extract-transform-load script that extracts, transforms, and loads a dataset selected by the user from the plurality of datasets; and wherein the computer readable program code is configured to retrieve data included in the dataset utilizing the extract-transform-load script, wherein the retrieving includes returning the data to the user.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
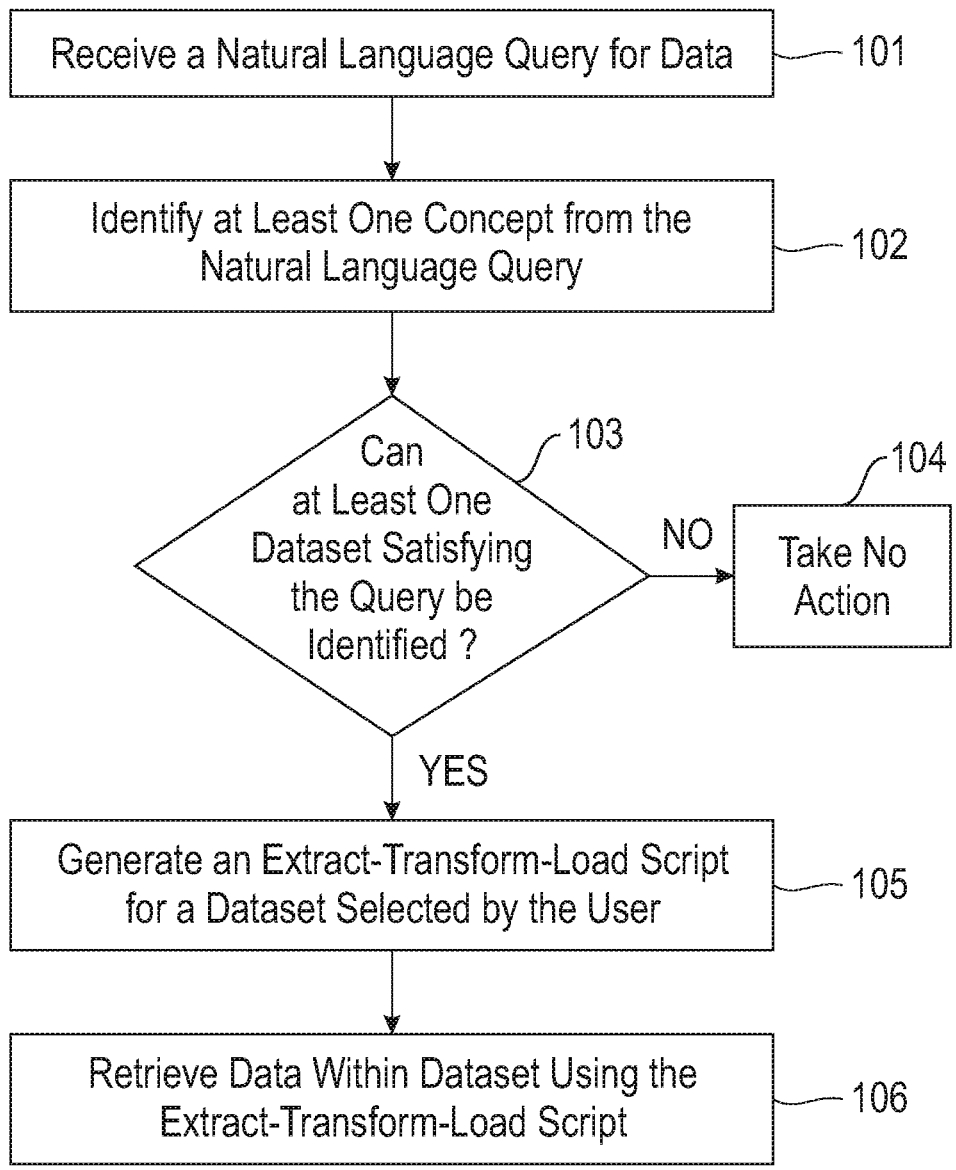
FIG. 1 illustrates a method for generating an extract-transform-load script for retrieving data that is spread across multiple data repositories and providing it to a user.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 and FIGS. 4-5 can be performed or utilized by way of a processing unit or units and system memory such as those indicated, respectively, at 16' and 28' in FIG. 3, whether on a server computer, a client computer, a node computer in a distributed network, or any combination thereof.

The problem with data being stored across multiple data repositories is that it can be difficult to retrieve. For example, if a user is attempting to retrieve particular data, the user may provide a query that is intended to retrieve the desired data. Conventional systems utilize an extract-transform-load (ETL) script that extracts the data from the data repository or location, runs transformations on the extracted data to transform it into the required form, and then load the transformed data into the destination location. However, each ETL script is unique for a particular dataset. For example, the extraction script must be unique for the data repository where the data is stored. As another example, the transformation script is unique based upon both the data and the desired transformation. Thus, the data scientist, data steward, enterprise application developer, or the like, must generate a unique ETL script for the desired data and desired transformation. This script generation can become very complicated and time-consuming particularly when the data of the desired dataset is stored across multiple data repositories or sub-repository locations.

Accordingly, an embodiment provides a system and method for generating an extract-transform-load script for retrieving data that is spread across multiple data repositories and providing it to a user. The system receives a natural language query from a user that is requesting data that is contained within at least one data repository, but is likely spread across multiple data repositories or locations. From the natural language query, the system identifies at least one concept that includes an entity and an intent. The intent can be identified by enriching the natural language query utilizing ontologies and/or glossaries.

Using the identified concept, the system identifies a plurality of datasets that satisfy the natural language query. Generally, the system ranks the datasets based upon relevance to the query and provides the ranked list of the datasets to the user. The user can then select the desired dataset, combination of datasets, or portions of different datasets for retrieval. Whichever dataset is selected by the user, even if a combination of datasets, portions of datasets, or the like, will be referred to herein as the desired dataset or selected dataset for ease of readability. However, this is not intended to limit the scope of this disclosure in any way. Once the user has selected the desired dataset, the system generates an ETL script to retrieve the desired dataset from the data location(s) where the data of the dataset is stored. The generated ETL script can then be used to retrieve the data from the data location(s), transform the retrieved data into the desired form, and load the transformed data into the destination data location or otherwise return the data of the dataset to the user.

Thus, the described system and method provides at least the start of an artificial intelligence powered automated extract-load-transform and data processing platform. The system provides an easy technique for discovering, transforming, and sharing data for and across different groups of users, including those users who do not have a strong knowledge or background in the data management domain. In other words, the system provides a technique that allows any user to discover and share data without the user needing a strong knowledge in data management to find and access the data which may be stored across multiple data repositories.

The system is able to identify data intent(s) from an input query provided by the user and enrich the identified intent using a glossary or ontology of business concepts. The query can be provided in a natural language format which is used by the system to perform a contextual dataset search and does not require the user, or the system, to have a knowledge of the datasets or the location of the desired data before the query is provided. The system can utilize the query to quickly search and easily identify datasets that may be responsive to the query even if the datasets are found or stored across multiple data repositories. For example, the system is able to discover datasets located across different data sources, for example, over a hybrid/multi-cloud environment, that match the data intents identified in the query. In determining a relevance of a dataset to the query, the system can apply access and governance policy constraints and output a ranked listing of the datasets based upon a relevance to the received query. Once the datasets are identified and selected by the user, the system can automatically generate a valid extract-transform-load script in order to provide the selected dataset in a desired location. Additionally, the system can utilize user feedback to improve future executions.

Such a system provides a technical improvement over current systems for ETL script generation. Instead of the time-consuming manual techniques of ETL script generation of conventional systems, the described system and method provides a technique for automatically generating the ETL script where the generated ETL script is unique for the desired data, transformation, and destination data location. This automatic script generation is particularly useful when the data of a desired dataset is stored across multiple data repositories, data sources, or data locations. The user simply provides a natural language query that identifies the dataset the user is looking to retrieve and, from the query, the system is able to identify possible datasets that satisfy the query and generate an ETL script to retrieve a dataset selected by the user. Thus, the described system provides a technical improvement to the data storage and retrieval technical field by providing a system and method that is more efficient and that does not require extensive manual programming and found in conventional systems. Additionally, the system and method retrieves datasets that satisfy the natural language query of the user.

FIG. 1 illustrates a method for generating an extract-transform-load script for retrieving data that is spread across multiple data repositories and providing it to a user. At 101 the system may receive, from a user, a natural language query for data contained within at least one data repository. For ease of readability this disclosure will generally use the example of multiple data repositories, locations, or sources. However, the described system and method can also be utilized if the data is stored within a single data repository. In an example, the multiple data repositories may be located across different data sources of a hybrid or multi-cloud environment. In other words, the datasets may be stored in a hybrid or multi-cloud environment. Generally, in such an environment, the user does not have control over the exact location of the data and, therefore, the environment will be stored in multiple locations within the hybrid or multi-cloud environment. The query is received at the system and it does not matter if the user knows where the data is stored. In other words, the system is able to identify the location or locations of the data and does not need to be directed to the correct data repository by the user. This is particularly useful since the data of a resulting dataset may be distributed across multiple data sources.

The natural language query may be received from a user or client who is attempting to retrieve data related to the query. For example, a user may provide the query "Retrieve data for all employees hired after the $1^{st}$ of January 2020." As seen from this example query, the query is provided in natural language as opposed to machine language. In other words, a natural language query includes a query that is provided in an ordinary human language, for example, as if the user were talking to another person. The term query will be used throughout. The natural language query may be provided in any form, for example, as audible input, text input, haptic input, gesture input, or the like.

At 102 the system identifies at least one concept from the natural language query. A concept includes an entity and an intent. In this case, entity refers to an entity as found in a sentence, phrase, or other linguistic element. Entities can be identified using entity and/or concept extraction techniques. For example, the system may employ an information extractor, semantic analysis technique, syntactic analysis technique, natural language parsing technique, or the like, to identify the entities contained within the natural language query. An intent may be explicit within the natural language query. In this case, the system may employ a concept extraction technique. However, an intent may also be implicit in the natural language query. To identify an implicit intent, the system enriches the entities or concepts identified within the query using a glossary or ontology of business concepts. The system can then append the identified intent, identified entities if not already identified in the query, and any other concepts not already explicitly identified in the query, to the query. This enriched query will then be used by the system in further steps.

At 103 the system determines if one or more datasets can be identified that satisfy the natural language query. In other words, the system queries the possible data locations with the enriched query to determine if any datasets may provide a responsive output to the query. A dataset may include data from one or more data repositories that are responsive to the query. Each possible dataset may not be completely unique from every other possible dataset. In other words, datasets may include data that is included in other possible datasets. To identify the plurality of datasets, the system utilizes the enriched query to identify relevant datasets. In identifying relevant datasets, the system may also take into account user constraints, dataset requirements, business context, policy and governance constraints, hardware and network constraints, and the like. These constraints, requirements, or the like, may change the relevancy of some datasets. The system may perform the querying while taking into account access and governance policies, at both a local and global level. Taking into account access and governance policies allows the system to ensure security of data that may be included in a dataset and prevents the sharing of data across data sources that do not have access to the data.

One technique for finding relevant datasets faster is to make the data within the data sources easier to search. To facilitate this, the system may perform metadata extraction on the stored data. The system may also annotate the data with business concepts. The metadata extraction and annotation allows the system to search the metadata and/or annotations instead of having to access every piece of datum, thereby providing a faster search. The metadata extraction and annotation may be performed a single time and may not be performed at the time of receipt of the query. Rather, this metadata extraction and annotation may be performed when the data is stored, at some predetermined time intervals, or the like. Thus, when the enriched query is utilized to perform a search, the search may be performed on the data, metadata, annotations, or a combination thereof.

If no datasets satisfying the query, particularly in view of user provided constraints, requirements, or the like, can be identified at 103, the system may take no action at 104. In other words, the system may determine that none of the datasets are policy compliant datasets. Alternatively, the system may provide an indication to a user that no datasets could be identified. The system may also provide an explanation for why a dataset could not be identified. For example, if the user provided constraints are too restrictive to identify a possible dataset, the system may notify the user of this reason for the inability to identify a dataset.

If, on the other hand, at least one dataset satisfying the query can be identified at 103, the system may generate an extract-transform-load (ETL) script at 105. The ETL script extracts the data from the data location(s), transforms the data into the desired form, and loads the data into an identified destination, for example, a data location designated by the user providing the query. Before generating the script, the system needs to identify which dataset to generate the script for. Accordingly, the dataset(s) are presented to the user for the user to select the desired dataset. In presenting the dataset(s) to the user, the system may rank the datasets based upon a relevance to the user query. Ranking the datasets includes not only ranking the tables of the datasets, but also ranking columns within the tables.

One technique that may be used in discovering a relevant dataset is to utilize a probabilistic inference network based weighting and ranking mechanism. Such a mechanism allows for ranking the datasets based upon their relevance to the identified data intents or entities of the query. This technique for ranking the datasets includes utilizing an unsupervised model that is built over the dataset to rank the dataset based upon any user provided constraints, requirements, or other information relevant to identifying a relevancy of the dataset. Using the unsupervised model, the system computes a probability that a given dataset is useful with respect to the user requirements or input query. Since the dataset contains both table level metadata and column level metadata, the system can rank both the table level metadata and column level metadata with respect to the input query.

The unsupervised model may have multiple parts, for example, a query independent information portion and a query dependent portion. The query independent portion is the portion of the algorithm that takes into account information that is not based upon the query, for example, the popularity of a particular dataset, how recent the data within a dataset is, costs, and the like. The query dependent portion is the portion of the algorithm that takes into account information that is based upon the query, for example, the relevancy of tables and columns to intents within the query, entities included in the query, and the like. In other words, the query dependent portion may take the information available about the data and match it against information included in the query to determine a relevancy of the data to the query. The algorithm then takes the query independent portion result and the query dependent portion result and combines the information into a single value for each dataset. The datasets can then be ranked based upon these values now corresponding to the dataset. The result is a ranked list of policy compliant datasets that can be presented to the user for selection of a desired dataset.

Once the user selects a dataset, which may be a single dataset, portions of different datasets, a subset of a single dataset, or any combination thereof, the system can then generate the ETL script. Generation of the ETL script may be in a fully automated manner or may be in a user supervised manner. In the user supervised manner, the system generates recommendations for the ETL script while the user is writing or programming the ETL script. The user can then decide whether to accept, modify, or reject a recommendation. In the fully automated ETL script generation manner, the system automatically generates the ETL script. Generation of the ETL script is performed while ensuring that best practices are followed, any security, storage, or access constraints are maintained, and the like. Even when the data included in a selected dataset is spread across multiple data locations, the system is still able to generate an ETL script. The ETL script specifies the source, execution, and target bindings for extracting, transforming, and loading the selected datasets.

Once the ETL script is generated and/or approved by the user, the system utilizes the ETL script to retrieve the data included in the selected dataset at 106. Retrieving the data includes returning the results of the query to the user at a desired location identified by the user. Each ETL script generation and data retrieval can be used to further train the system to improve subsequent ETL script generations and data retrievals. To facilitate this learning, the system allows the user to provide feedback from the entity and intent identification step to the ETL script generation step. In other words, the user can provide feedback for the entity and intent identification, dataset identification, and ETL script generation steps, in either the user supervised manner or the fully automated manner. Thus, the system becomes better at performing any of these steps with each iteration of the process.

Figure 2:
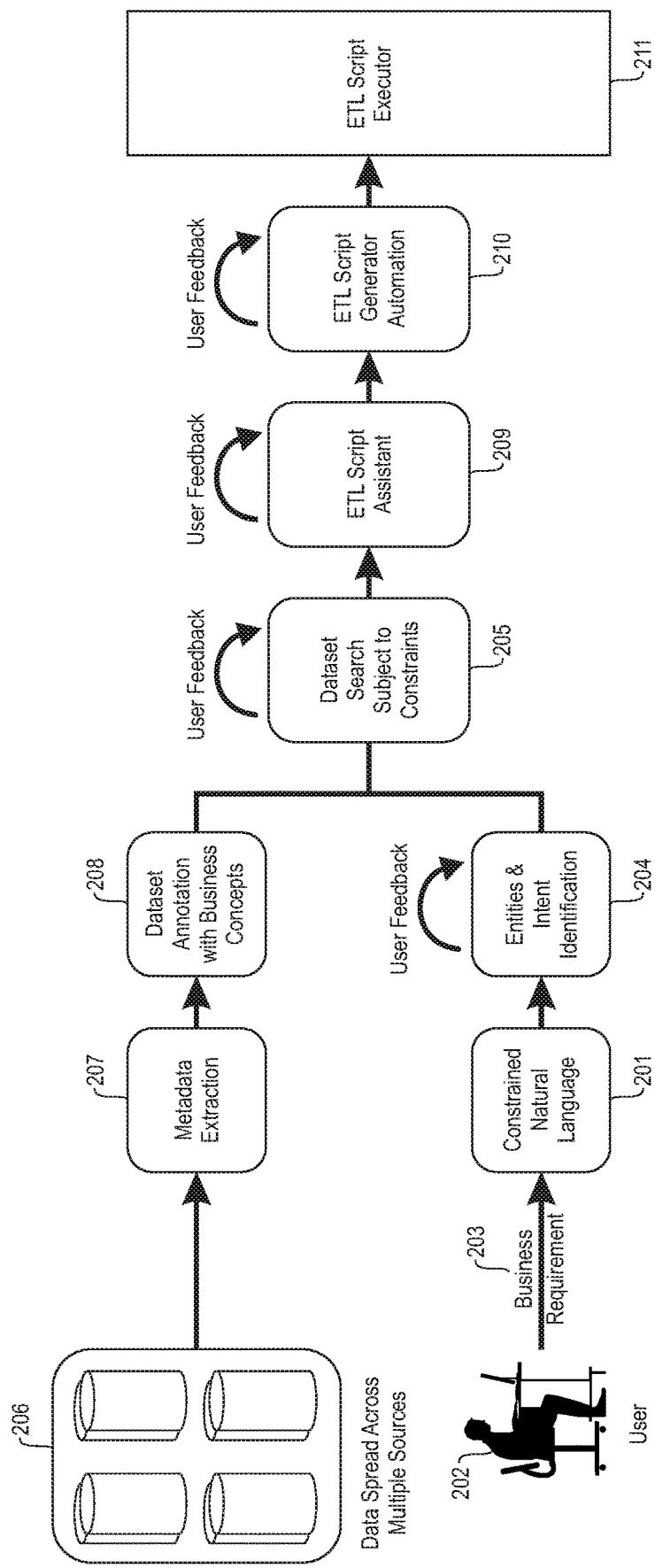
FIG. 2 illustrates an example system architecture for generating an extract-transform-load script for retrieving data that is spread across multiple data repositories and providing it to a user.

FIG. 2 illustrates an overall system architecture of the described system and method. The system receives a constrained natural language query 201 from a user 202. The system also receives business requirements 203, user constraints, or the like, from the user. The system identifies entities and intents 204 from the query. In identifying the entities and intents the system may enrich the entities and intents utilizing a glossary or ontology of business concepts. As noted in FIG. 2, this step also allows user feedback. Using the identified entities and intents, the system performs a dataset search subject to the identified constraints 205. The search is performed on data spread across multiple data sources 206. To perform the search more quickly, the system may extract metadata from the data 207 and also perform annotations on the dataset with business concepts 208. The search may then be performed on the data, metadata, and/or annotations. The identified datasets are ranked based upon a relevance of the dataset to the query. Additionally, in performing the dataset identification the system selects those datasets that satisfy any access and policy constraints, user constraints, filters, or the like. The ranked list is then provided to a user for selection of the desired dataset(s). The user can also provide feedback on the dataset identification.

Once a dataset is selected by the user, the system generates an ETL script. The process of generating an ETL script can either be performed using an ETL script assistant 209, automated ETL script generator 210, or combination thereof. The ETL script assistant 209 can generate recommendations while a user is writing ETL jobs. In other words, the assistant works with the user as the user is writing an ETL script. As the user is writing the ETL script, the ETL script assistant 209 makes recommendations for the script. Additionally, the ETL script assistant 209 may suggest data cleaning. The automated ETL script generator 210 utilizes artificial intelligence to automate the generation of the ETL script. In generating the ETL script the automated ETL script generator 210 ensures that best practices are followed and that any network, storage, access, security, or other constraints are maintained. As noted, user feedback can be provided for either of these two processes. Once the ETL script is generated, the system utilizes an ETL script executor 211 to execute the generated script to extract the data of the selected dataset from the data location(s), transform the extracted data into the desired form, and load the transformed data into a destination data location identified by the user.

Figure 3:
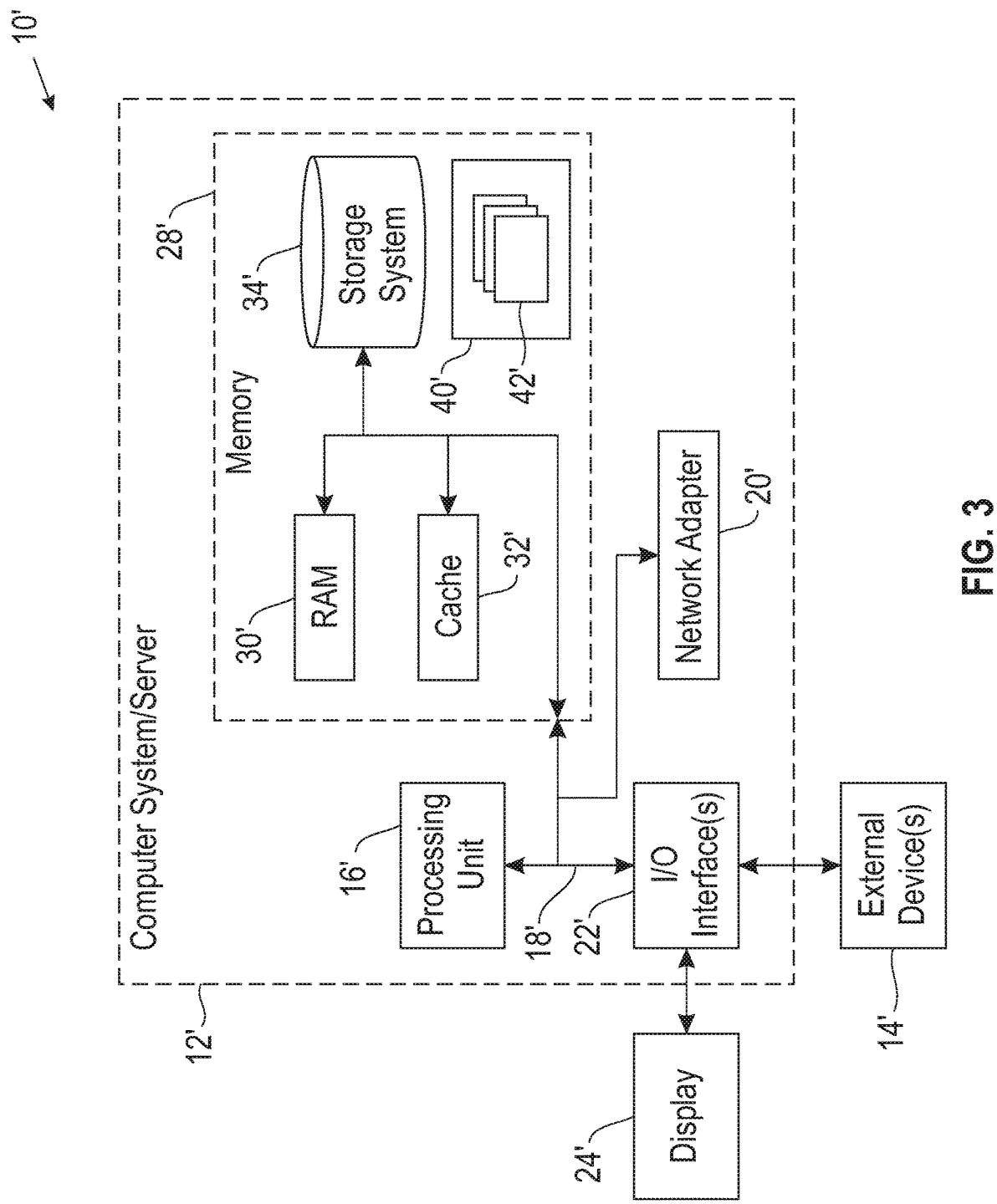
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/ server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/ server 12' can communicate with at least one network such as a local area network (LAN), a general wide area network (WAN), and/or a public network (e.g., the Internet) via network adapter 20'. As depicted, network adapter 20' communicates with the other components of computer system/ server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
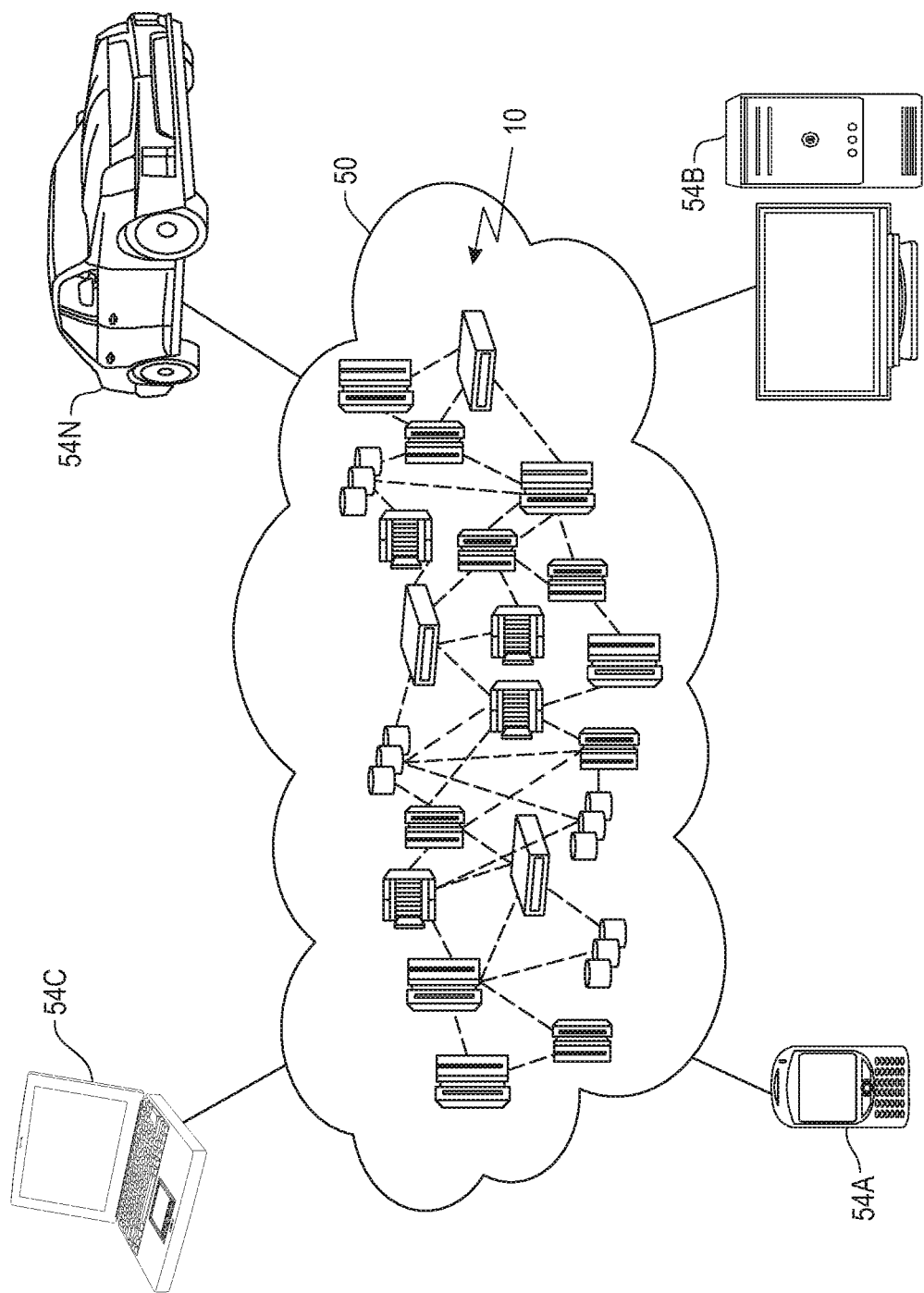
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 5:
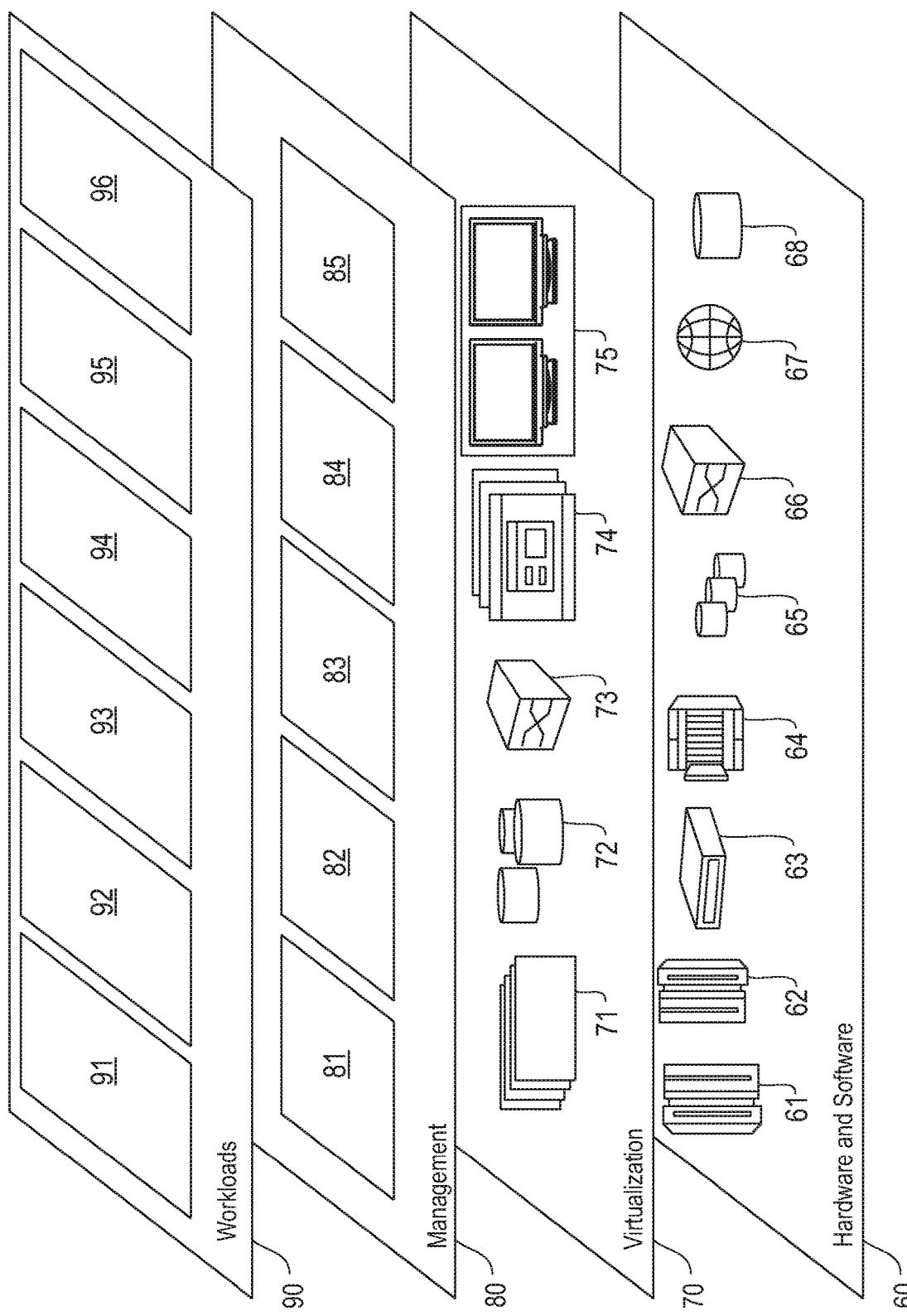
FIG. 5 depicts abstraction model layers according to an embodiment of the present invention.

Referring now to FIG. 5, a set of functional abstraction layers provided by cloud computing environment 50 (FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and extract-transform-load script generation and execution 96, as described here throughout.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
   receiving, from a user, a natural language query for data contained within at least one data repository;
   identifying at least one concept from the natural language query, wherein the at least one concept comprises an entity and an intent;
   identifying a plurality of datasets satisfying the natural language query by querying the at least one data repository utilizing the at least one concept;
   ranking the plurality of datasets by determining, for each of the plurality of datasets, a relevance probability utilizing at least a plurality of unsupervised models, wherein each of the plurality of unsupervised models is built over one of the plurality of datasets, wherein each of the plurality of unsupervised models comprise a query independent portion and a query dependent portion based upon the natural language query, each of the plurality of unsupervised models, analyzing, using the query dependent portion of a given of the plurality of unsupervised models, one of the plurality of datasets corresponding to the given of the plurality of unsupervised models against the natural language query and aggregating a result of the query independent portion and a result of the query dependent portion of the given of the plurality of unsupervised models to generate the relevance probability for the one of the plurality of datasets;
   presenting the ranked plurality of datasets to the user;
   generating an extract-transform-load script that extracts, transforms, and loads a dataset selected by the user from the plurality of datasets presented to the user; and
   retrieving data included in the dataset utilizing the extract-transform-load script, wherein the retrieving comprises returning the data to the user.

2. The computer implemented method of claim 1, wherein the identifying at least one concept comprises extracting, using an entity extraction technique, at least one entity from the natural language query and appending at least one intent to the natural language query by enriching the at least one entity utilizing an ontology to identify the at least one intent.

3. The computer implemented method of claim 1, wherein the identifying a plurality of datasets comprises performing the querying in view of user provided constraints.

4. The computer implemented method of claim 1, wherein the identifying a plurality of datasets comprises accessing the data contained within at least one data repository, extracting metadata from the data, and annotating the data with business concepts.

5. The computer implemented method of claim 1, wherein the ranking comprises ranking both tables and columns within each of the plurality of datasets.

6. The computer implemented method of claim 1, wherein the generating comprises generating an extract-transform-load script that extracts, transforms, and loads data included in the dataset selected by the user that is distributed across more than one data repository.

7. The computer implemented method of claim 1, wherein the generating comprises generating a recommended extract-transform-load script for approval by the user.

8. The computer implemented method of claim 1, wherein the generating is performed in view of maintaining constraints on the data.

9. The computer implemented method of claim 1, comprising receiving feedback from the user regarding the plurality of datasets and improving subsequent identifications of datasets utilizing the feedback.

10. An apparatus, comprising:
at least one processor; and
a computer readable storage medium having computer readable program code embodied therewith and executable by the at least one processor;
wherein the computer readable program code is configured to receive, from a user, a natural language query for data contained within at least one data repository;
wherein the computer readable program code is configured to identify at least one concept from the natural language query, wherein the at least one concept comprises an entity and an intent;
wherein the computer readable program code is configured to identify a plurality of datasets satisfying the natural language query by querying the at least one data repository utilizing the at least one concept;
wherein the computer readable program code is configured to rank the plurality of datasets by determining, for each of the plurality of datasets, a relevance probability utilizing at least a plurality of unsupervised models, wherein each of the plurality of unsupervised models is built over one of the plurality of datasets, wherein each of the plurality of unsupervised models comprise a query independent portion and a query dependent portion based upon the natural language query, each of the plurality of unsupervised models, analyzing, using the query dependent portion of a given of the plurality of unsupervised models, one of the plurality of datasets corresponding to the given of the plurality of unsupervised models against the natural language query and aggregating a result of the query independent portion and a result of the query dependent portion of the given of the plurality of unsupervised models to generate the relevance probability for the one of the plurality of datasets;
wherein the computer readable program code is configured to present the ranked plurality of datasets to the user;
wherein the computer readable program code is configured to generate an extract-transform-load script that extracts, transforms, and loads a dataset selected by the user from the plurality of datasets presented to the user; and
wherein the computer readable program code is configured to retrieve data included in the dataset utilizing the extract-transform-load script, wherein the retrieving comprises returning the data to the user.

11. A computer program product, comprising:
a computer readable storage medium having computer readable program code embodied therewith, the computer readable program code executable by a processor;
wherein the computer readable program code is configured to receive, from a user, a natural language query for data contained within at least one data repository;
wherein the computer readable program code is configured to identify at least one concept from the natural language query, wherein the at least one concept comprises an entity and an intent;
wherein the computer readable program code is configured to identify a plurality of datasets satisfying the natural language query by querying the at least one data repository utilizing the at least one concept;
wherein the computer readable program code is configured to rank the plurality of datasets by determining, for each of the plurality of datasets, a relevance probability utilizing at least a plurality of unsupervised models, wherein each of the plurality of unsupervised models is built over one of the plurality of datasets, wherein each of the plurality of unsupervised models comprise a query independent portion and a query dependent portion based upon the natural language query, each of the plurality of unsupervised models, analyzing, using the query dependent portion of a given of the plurality of unsupervised models, one of the plurality of datasets corresponding to the given of the plurality of unsupervised models against the natural language query and aggregating a result of the query independent portion and a result of the query dependent portion of the given of the plurality of unsupervised models to generate the relevance probability for the one of the plurality of datasets;
wherein the computer readable program code is configured to present the ranked plurality of datasets to the user;
wherein the computer readable program code is configured to generate an extract-transform-load script that extracts, transforms, and loads a dataset selected by the user from the plurality of datasets presented to the user; and
wherein the computer readable program code is configured to retrieve data included in the dataset utilizing the extract-transform-load script, wherein the retrieving comprises returning the data to the user.

12. The computer program product of claim 11, wherein the identifying at least one concept comprises extracting, using an entity extraction technique, at least one entity from the natural language query and appending at least one intent to the natural language query by enriching the at least one entity utilizing an ontology to identify the at least one intent.

13. The computer program product of claim 11, wherein the identifying a plurality of datasets comprises performing the querying in view of user provided constraints.

14. The computer program product of claim 11, wherein the identifying a plurality of datasets comprises accessing the data contained within at least one data repository, extracting metadata from the data, and annotating the data with business concepts.

15. The computer program product of claim 11, wherein the ranking comprises ranking both tables and columns within each of the plurality of datasets.

16. The computer program product of claim 11, wherein the generating comprises generating an extract-transform-load script that extracts, transforms, and loads data included in the dataset selected by the user that is distributed across more than one data repository.

17. The computer program product of claim 11, wherein the generating comprises generating a recommended extract-transform-load script for approval by the user.

18. The computer program product of claim 11, wherein the generating is performed in view of maintaining constraints on the data.

\* \* \* \* \*